(12) United States Patent
Ullrich et al.

(10) Patent No.: US 7,316,308 B2
(45) Date of Patent: Jan. 8, 2008

(54) SUPPORTING DEVICE OF A TRANSPORT DEVICE OF A SOLDERING APPARATUS

(75) Inventors: Rudolf Ullrich, Kreuzwertheim (DE); Thomas Schlembach, Marktheidenfeld (DE)

(73) Assignee: Seho Systemtechnik GmbH, Kreuzwertheim (DE)

( * ) Notice: Subject to any disclaimer, the term of this patent is extended or adjusted under 35 U.S.C. 154(b) by 0 days.

(21) Appl. No.: 11/591,513

(22) Filed: Nov. 2, 2006

(65) Prior Publication Data

US 2007/0114265 A1    May 24, 2007

(30) Foreign Application Priority Data

Nov. 18, 2005   (DE)   .................. 20 2005 018 076 U

(51) Int. Cl.
*B65G 23/44*   (2006.01)

(52) U.S. Cl. .................. 198/817; 198/473.1; 198/726; 198/803.11

(58) Field of Classification Search ............. 198/473.1, 198/584, 608, 626.1, 726, 803.11, 813, 814, 198/817, 861.1
See application file for complete search history.

(56) References Cited

U.S. PATENT DOCUMENTS

| | | | |
|---|---|---|---|
| 2,850,147 A | | 9/1958 | Hill |
| 3,307,493 A | * | 3/1967 | Keller et al. ............. 104/172.1 |
| 3,707,218 A | | 12/1972 | Payne et al. |
| 3,920,115 A | * | 11/1975 | Craggs ........................ 198/822 |
| 4,144,965 A | | 3/1979 | Alldredge et al. |
| 5,031,752 A | | 7/1991 | Rostowski et al. |
| 5,038,919 A | * | 8/1991 | Harston ................... 198/626.1 |
| 5,066,834 A | | 11/1991 | Richter |
| 5,267,853 A | * | 12/1993 | Arai ............................. 432/59 |
| 5,797,481 A | * | 8/1998 | Uber et al. ................. 198/813 |
| 5,871,325 A | * | 2/1999 | Schmidt et al. ............. 414/150 |
| 6,012,568 A | * | 1/2000 | Kane ........................... 198/817 |
| 6,247,581 B1 | * | 6/2001 | Oswald et al. .............. 198/812 |
| 6,336,550 B1 | | 1/2002 | Müntener |
| 6,374,537 B1 | * | 4/2002 | Van Wingerden et al. ...... 47/17 |
| 6,471,050 B2 | * | 10/2002 | Ikeda et al. .............. 198/861.1 |
| 6,499,588 B1 | | 12/2002 | Eberle |

FOREIGN PATENT DOCUMENTS

| | | |
|---|---|---|
| DE | 8 02 063 | 2/1951 |
| DE | 1 073 522 A | 1/1960 |

(Continued)

*Primary Examiner*—Douglas A Hess
(74) *Attorney, Agent, or Firm*—Birch, Stewart, Kolasch & Birch, LLP

(57) ABSTRACT

The invention relates to a supporting device of the transport device of a soldering apparatus for the conveying of printed-circuit boards with at least two revolving, endless transport chains, said transport chains running in guide rails in the transport zone and each passing through two guide elements at the ends of the transport zone, wherein, for adaptation to the width of the respective printed-circuit boards, the guide elements are mounted on a carrier such as to be displaccable transverse to the conveying direction. The guide elements, each associated with a respective conveying chain, are interconnected by flexible tension elements, said tension elements being adjustable with regard to their tensile stress and running parallel to the respective conveying chain in the transport zone, the value of the tensile stress being so highly adjusted that the tension elements prevent the guide rails from deviating from a straight line.

6 Claims, 2 Drawing Sheets

FOREIGN PATENT DOCUMENTS

| | | |
|---|---|---|
| DE | 9 76 949 | 9/1964 |
| DE | 1 278 380 | 9/1968 |
| DE | 2 152 701 | 4/1972 |
| DE | 39 09 309 A1 | 9/1990 |
| DE | 92 01 040 U1 | 3/1992 |
| DE | 197 38 290 A1 | 3/1999 |
| DE | 199 22 245 A1 | 11/2000 |
| DE | 103 45 871 A1 | 4/2005 |
| EP | 0 001 182 B2 | 3/1979 |
| GB | 1138796 | 1/1969 |
| WO | WO-89/12 595 A1 | 12/1989 |

* cited by examiner

SUPPORTING DEVICE OF A TRANSPORT DEVICE OF A SOLDERING APPARATUS

BACKGROUND OF THE INVENTION

1. Field of the Invention

The invention relates to a supporting device of a transport device of a soldering apparatus for the conveying of printed-circuit boards with at least two revolving, endless transport chains, said transport chains running in guide rails in the transport zone and each passing through two guide elements at the ends of the transport zone, wherein, for adaptation to the width of the respective printed-circuit boards, the guide elements are mounted on a carrier such as to be displaccable transverse to the conveying direction.

2. Description of Background Art

Generally, in supporting devices of transport devices in soldering apparatuses for the conveying of printed-circuit boards, there is a high thermal loading at least in the transport zone. Thus, temperatures up to 300° C. Or above are perfectly customary in the transport zone. Such high temperatures lead to material-induced thermal expansion of the elements of the supporting device of the transport device. Such thermal expansion, which varies for the different elements of the supporting device of the transport device depending on the mass, geometry and material thereof, is, in the prior art, accommodated and/or compensated by appropriate adjusting means or supports, this resulting in the prior art in a high degree of structural complexity. This high degree of structural complexity, however, is necessary in order always to guarantee the reliable transport of the printed-circuit boards under all operating states, i.e. including in the case of different temperatures in different sections of the transport zone. More particularly, it is necessary, in the prior art, for the guide rails—in which run the endless transport chains in the transport zone—to be, where possible, in the form of individually mounted rail segments which, also in the case of thermal expansion, can be kept in alignment with each other through appropriate adjustability of the mountings and through the arrangement of expansion joints between the segments, the intention being to prevent vertical and horizontal deflection of the rail segments. However, even this high degree of design complexity with adjustable individual mounting of rail segments is not always able to ensure completely reliable guiding, particularly where there are temperature differences in different sections along the transport zone, because the necessary tolerances, especially of the expansion joints, are easily exceeded.

SUMMARY AND OBJECTS OF THE INVENTION

It is therefore the object of the present invention to provide a supporting device of a transport device of a soldering apparatus which overcomes the disadvantages of the prior art and which, more particularly, offers reliable guiding, irrespective of thermal expansion in the transport zone, and thereof independent transport of the printed-circuit boards, it being the intention that the employed design should be as simple and as cost-effective as possible.

The object of the invention is achieved by a supporting device of a transport device of a soldering apparatus for the conveying of printed-circuit boards (1) with at least two revolving, endless transport chains (2, 3). The transport chains (2, 3) running in guide rails (4, 5) in a transport zone and each passing through two guide elements (6, 7 and 8, 9) at the ends of the transport zone, wherein, for adaptation to the width of the respective printed-circuit boards (1). The guide elements (6, 7 and 8, 9) are mounted on a carrier (10) such as to be manually displaccable transverse to the conveying direction. The guide elements (6, 7 and 8, 9), each associated with a respective conveying chain (2, 3), are interconnected by flexible tension elements (11, 12). The tension elements (11, 12) being adjustable with regard to their tensile stress and running parallel to the respective conveying chain (2, 3) in the transport zone with the value of the tensile stress being so highly adjusted that the tension elements (11, 12) prevent the guide rails (4, 5) from deviating from a straight line.

According to the invention, the supporting device of a transport device of a soldering apparatus for the conveying of printed-circuit boards has at least two revolving, endless transport chains, said transport chains running in guide rails in the transport zone and each passing through two guide elements at the ends of the transport zone, wherein, for adaptation to the width of the respective printed-circuit boards, the guide elements are mounted on a carrier, preferably on a frame of the transport device, such as to be manually displaccable transverse to the conveying direction. According to the invention, the guide elements, each associated with a respective conveying chain, are interconnected at the respective ends of the transport zone by flexible tension elements, said tension elements being adjustable with regard to their tensile stress and running parallel to the respective conveying chain in the transport zone, the value of the tensile stress being so highly adjusted that the tension elements act like non-deflectable, straight beams and thus prevent the guide rails from deviating from a straight line. Therefore, the value of the tensile stress exerted on the tension elements is so great that said tension elements prevent the deviation of the guide rails even in the case of different and high temperatures in different sections of the transport zone. According to the invention, the tension elements always extend parallel to the respective, associated conveying chain, with the result that the conveying chain, which runs in the respective guide rail, always runs in a straight line in the transport zone, thereby guaranteeing the reliable transport of the printed-circuit boards. According to the invention, therefore, the guide rails are unable to deflect in either the vertical or the horizontal direction owing to their thermal expansion coefficients.

According to a preferred embodiment of the invention, the value of the tensile stress may be of the order of magnitude of 1.5 t; preferably, the value of the tensile stress may be up to 6 t.

According to a preferred embodiment of the supporting device according to the invention, the respective tension element carries the respective guide rail, wherein, in a particularly preferred embodiment, the respective guide rail is provided with a groove in which runs the respective tension element, with the result that the guide rail is guided on the respective tension element with the groove running on the tension element. In a particularly preferred embodiment, the guide rail is able, in the case of thermal expansion, to move on the tension element in relation thereto.

Preferably, each of the tension elements has a tensioning wire, and, at least in the region of one of the ends of the transport zone, the respective tensioning wire of the respective tension element is set under tensile stress by at least one adjustable spring element. In a particularly preferred embodiment, the respective spring element has a tensioning spring and a tensioning screw or tensioning element by which the tensile stress acting on the respective tensioning wire is adjustable.

Preferably, the adjustable spring element, which, in a particularly preferred embodiment, consists of the tensioning spring and the tensioning screw, is situated in a region of the supporting device outside the actual transport zone, with the result that, especially there, there is no thermal loading with high temperatures and corresponding material expansion.

Particularly preferred is an embodiment of the supporting device according to the invention in which, at least in the region of one of the ends of the transport zone, the tensioning wire of each of the tension elements is downwardly deflected by a deflecting means of the associated guide elements, the deflecting means consisting of a rotatably mounted circular-segment disc or circular disc. In this manner, it is possible, in the case of a change of the tensile stress, for friction to be prevented in the region of the deflecting means. Generally, the purpose of the deflecting means is to move the adjustable spring elements to a region of the supporting device where it is not in the way and does not obstruct the transport of the printed-circuit boards.

According to a preferred embodiment of the supporting device according to the invention, the guide rails may be of one-piece design, since, of course, according to the invention, the guide rails are prevented from deviating from a straight line, with the result that, according to the invention, it is possible to dispense with the splitting of the guide rails into many segments which need in complex manner to be aligned with each other, as is necessary according to the prior art. This particularly increases the simplicity of the supporting device according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
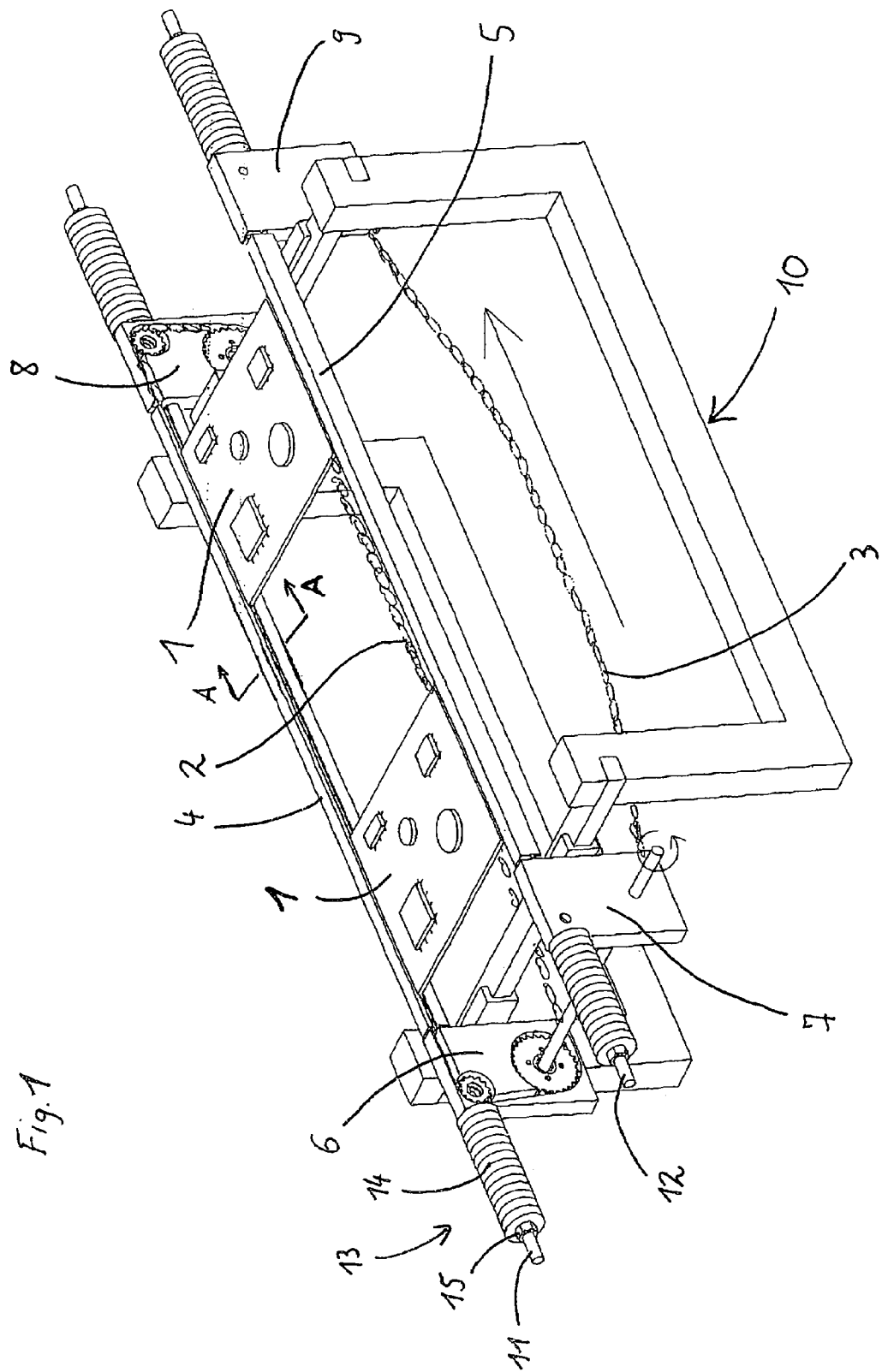
FIG. 1 is a perspective view of a supporting device according to an embodiment of the present invention.

FIG. 1 is a diagrammatic perspective view of a preferred embodiment of a supporting device (according to the invention) of a transport device of a soldering apparatus for the conveying of printed-circuit boards 1. The supporting device has two revolving, endless transport chains 2, 3 which run in guide rails 4, 5 in the upper region of the supporting device according to the invention, i.e. in the transport zone of the supporting device according to the invention, and which each pass through two guide elements 6, 7 and 8, 9 at the ends of the transport zone. Adaptation to the width of the printed-circuit boards 1 is possible, wherein the guide elements 6, 7 and 8, 9 are mounted on a carrier 10, which is in the form of a frame with two U-members 10a and two longitudinal members 10b such as to be manually displaceable transverse to the conveying direction. According to the invention, the guide elements 6, 7 and 8, 9, which are each associated with one of the conveying chains 2, 3, are interconnected by flexible tension elements 11, 12 which are adjustable with regard to their tensile stress and which extend parallel to the respective conveying chain 2, 3 in the transport zone. According to the invention, the value of the respective tensile stress is so highly adjusted that the tension elements 11, 12 prevent the guide rails 4, 5 from deviating from a straight line if, for example as a result of high temperatures in the transport zone, there is thermal expansion of the printed-circuit boards, guide rails, transport chains or parts of the supporting device 10.

Figure 2:
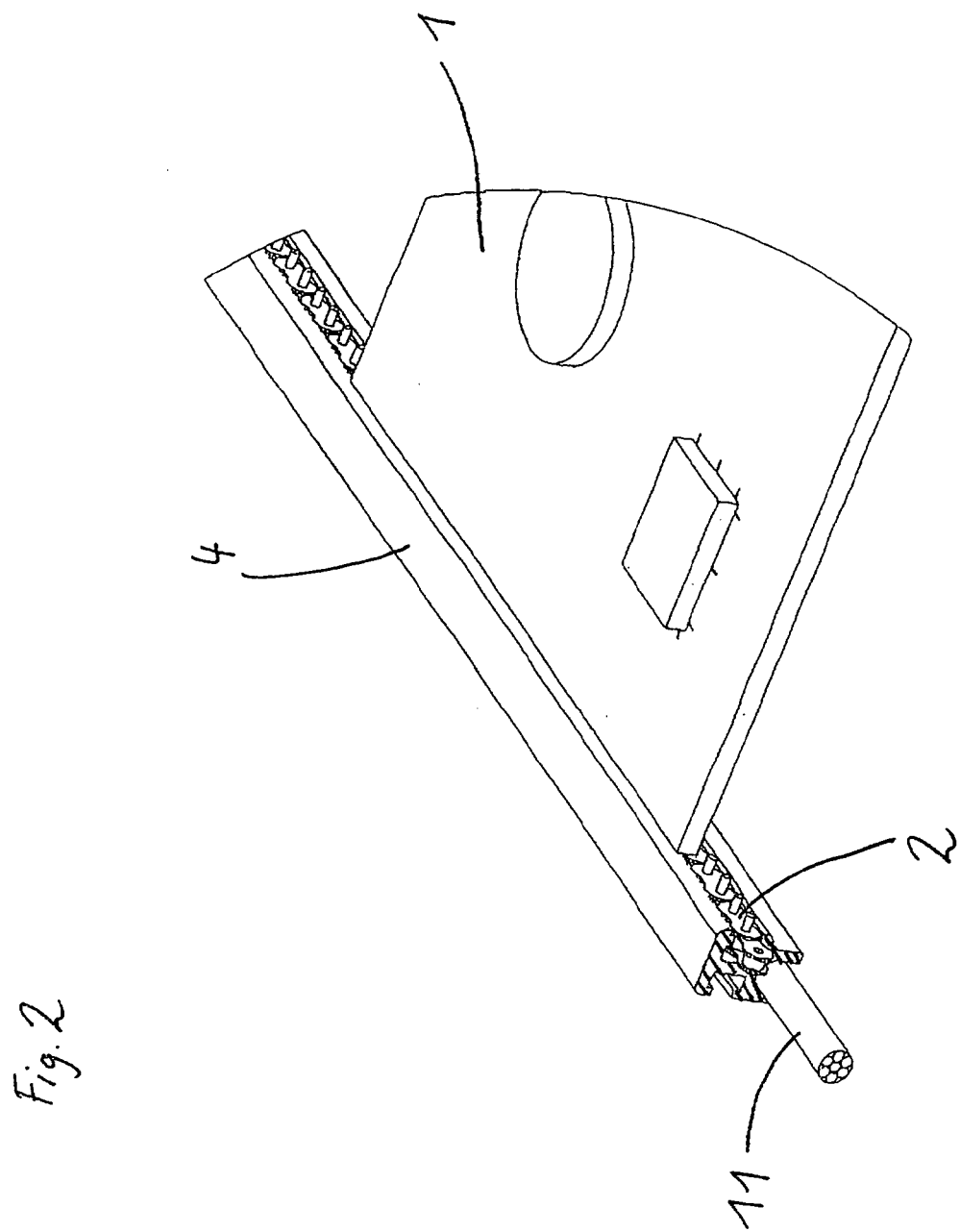
FIG. 2 is a diagrammatic enlarged perspective view, partially cut along line A-A in FIG. 1, of a detail of the supporting device from FIG. 1.

FIG. 2 shows an enlarged perspective view, partially cut along line A-A in FIG. 1, of a part of the supporting device according to the invention in FIG. 1.

FIG. 2 shows particularly clearly the guide rail 4 in which the endless transport chain 2 is guided in the transport zone, wherein, according to the embodiment presented in FIG. 2, guiding takes place in a T-shaped portion of the guide rail 4, which, in this case, extends in one piece over the entire length of the transport zone. The printed-circuit board 1 to be transported rests on the extended chain links of the transport chain 2. This is generally known from the prior art and, just like the general design of the transport chain 2, is not explained here in any greater detail, since this is common knowledge to the person skilled in the art. According to the invention, the flexible tension element 11 is so set under tensile stress that the value of the tensile stress prevents the guide rail 4 from deviating from a straight line. The tension element 11, which is here in the form of a tensioning wire, carries the guide rail 4, the guide rail 4 having a U-shaped groove on its underside with which it rests on the tensioning wire of the tension element 11.

Once again with regard to FIG. 1, each of the tension elements 11, 12 has a tensioning wire, and provided at each of the ends of the transport zone is an adjustable spring element 13 which sets the tension element 11 or tensioning wire of the tension element 11, 12 under tensile stress. The spring element 13 has a tensioning spring 14 and a tensioning screw 15, wherein, through suitable selection of the characteristics of the tensioning spring 14 and through adjustment of the tensioning screw 15, the value of the tensile stress acting on the respective tension element 11, 12 is adjustable.

If the tensioning springs 14, which extend outwardly from the supporting device of the transport device, are unfavorably situated for spatial reasons, the tension elements 11 and 12 can, having passed through the guide elements 6 and 7 as well as 8 and 9, be downwardly deflected by a bow-shaped support into the inside region of the supporting device, where the tensioning springs are then positioned below the transport device with the transport chains 2 and 3, where they cause no spatial problems. In this connection, it should also be noted that, instead of the tensioning springs, it is also possible to employ, for example, pneumatic spring elements or similar.

The supporting device according to the invention makes it possible to compensate or prevent influences resulting from the thermal expansion of individual components of a supporting device, with the consequence that, under all circumstances, there is, according to the invention, the guarantee of reliable transport of printed-circuit boards in the transport zone. More particularly, the tension elements 11, 12 according to the invention have only a relatively small mass, with the result that also the thermal expansion effect of the tension elements themselves is only small, it being the case that, owing to the flexibility of the tension elements and owing to the adjustability of the tensile stress, said thermal expansion effect is unable to have a negative influence on the straight-line trajectory of the tension elements and therefore of the conveying chains which run in the associated guide rails.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Supporting device for a transport device of a soldering apparatus for the conveying of printed-circuit boards (1) with at least two revolving, endless transport chains (2, 3), said transport chains (2, 3) running in guide rails (4, 5) in a transport zone and each passing through two guide elements (6, 7 and 8, 9) at the ends of the transport zone, wherein, for adaptation to the width of the respective printed-circuit boards (1), the guide elements (6, 7 and 8, 9) are mounted on a carrier (10) such as to be manually displaceable transverse to the conveying direction, characterized in that the guide elements (6, 7 and 8, 9), each associated with a respective conveying chain (2, 3), are interconnected by flexible tension elements (11, 12), said tension elements (11, 12) being adjustable with regard to their tensile stress and running parallel to the respective conveying chain (2, 3) in the transport zone, the value of the tensile stress being so highly adjusted that the tension elements (11, 12) prevent the guide rails (4, 5) from deviating from a straight line.

2. Supporting device according to claim 1, characterized in that the respective tension element (11, 12) carries the respective guide rail (4, 5).

3. Supporting device according to claim 1, characterized in that each of the tension elements (11, 12) has a tensioning wire, and in that, at least in a region of one of the ends of the transport zone, the respective tensioning wire is set under tensile stress by at least one adjustable spring element (13).

4. Supporting device according to claim 3, characterized in that the spring element (13) has a tensioning spring (14) and a tensioning screw (15).

5. Supporting device according to claim 3, characterized in that, at least in the region of one of the ends of the transport zone, the tensioning wire of each of the tension elements (11, 12) is downwardly deflected by a deflecting means of the associated guide elements (6, 7 and 8, 9), the deflecting means consisting of a rotatably mounted circular-segment disc.

6. Supporting device according to claim 1, characterized in that the guide rails (4, 5) are of one-piece design.

* * * * *